United States Patent [19]

Lee

[11] Patent Number: 5,542,300
[45] Date of Patent: Aug. 6, 1996

[54] LOW COST, CENTER-MOUNTED CAPACITIVE PRESSURE SENSOR

[75] Inventor: Shih-Ying Lee, Lincoln, Mass.

[73] Assignee: Setra Systems, Inc., Acton, Mass.

[21] Appl. No.: 186,003

[22] Filed: Jan. 24, 1994

[51] Int. Cl.⁶ .................................................. H01G 1/00
[52] U.S. Cl. ............................................. 73/724; 73/718
[58] Field of Search .................... 73/718, 724; 361/302, 361/283.4, 288

[56] References Cited

U.S. PATENT DOCUMENTS

| | | |
|---|---|---|
| 1,804,698 | 2/1928 | Luckey . |
| 2,101,153 | 12/1937 | Muth et al. . |
| 2,115,143 | 4/1938 | Harrison . |
| 2,164,638 | 7/1939 | Broeze et al. . |
| 2,171,655 | 9/1939 | Johnson . |
| 2,179,068 | 11/1939 | Sprague . |
| 2,179,417 | 11/1939 | Maxham . |
| 2,367,866 | 1/1945 | Humphreys et al. . |
| 2,568,238 | 9/1951 | Le Van . |
| 2,896,138 | 7/1959 | Grinstead . |
| 3,000,215 | 9/1961 | Atanasoff et al. . |
| 3,229,512 | 1/1966 | Goudswaard et al. . |
| 3,230,431 | 1/1966 | Deniston . |
| 3,280,628 | 10/1966 | Schloss . |
| 3,347,272 | 10/1967 | Rast . |
| 3,356,917 | 12/1967 | Goldstein . |
| 3,411,348 | 11/1968 | Schultheis, Jr. . |
| 3,418,546 | 12/1968 | Beavers et al. . |
| 3,479,879 | 11/1969 | Music . |
| 3,814,998 | 6/1974 | Thoma et al. . |
| 3,859,575 | 1/1975 | Lee et al. . |
| 4,229,776 | 10/1980 | Antikainen et al. ..................... 73/718 |
| 4,357,834 | 11/1982 | Kimura .................................... 73/724 |
| 4,358,814 | 11/1982 | Lee et al. ................................. 73/724 |
| B1 3,859,575 | 5/1988 | Lee et al. . |

FOREIGN PATENT DOCUMENTS

| | | |
|---|---|---|
| 1552069 | of 1967 | France . |
| 1924183 | 5/1969 | Germany . |
| 1648764 | 1/1970 | Germany . |
| 210421 | 11/1966 | Russian Federation . |
| 130688 | of 1946 | Switzerland . |
| 513771 | 10/1939 | United Kingdom . |

OTHER PUBLICATIONS

Russian Publication Izmerital'naia Tekhnika, Mar. 1969 Issue (issue #3), "Capacitive Displacement Transducer with Deflecting Electrodes", A. P. Gritsenko, A. E. Kritskii and I. N. Magda, pp. 47–49*.

Sanderson, et al., A Micro–Miniature Solid–State Capacitive Blood Pressure Transducer With Improved Sensitivity, IEEE Transactions on Biomedical Engineering vol, BME 20, No. 4, Jul., 1973, pp. 312–314 (IEEE, Inc., N.Y.).

Setra Systems, Inc., "Gage Pressure Transducer, Model 200", Product Brochure (1969).

*Primary Examiner*—Richard Chilcot
*Assistant Examiner*—R. Biegel
*Attorney, Agent, or Firm*—Peter J. Manus, Esq.

[57] ABSTRACT

A variable capacitance type pressure sensor with excellent manufacturability center-mounts an electrode on an edge-mounted diaphragm using a metal-glass-metal subassembly. An inner metal post of the assembly is welded to the diaphragm. A solder or flowable cement secures the electrode to an outer metal collar of the assembly with the initial diaphragm-to-electrode spacing set by a temporary shim. The position of the glass and the physical lengths of the metallic members of the assembly are adjusted to provide self-compensation for temperature variations. In a preferred form for low and medium pressure applications, the diaphragm is stamped from sheet metal with a central dimple that resists rotation of the attached assembly and isolates diaphragm deformation stresses from the post-to-diaphragm weld. In a high pressure form, a machined central boss isolates this weld from stress. A fitting that edge-mounts the diaphragm has a thinned end wall, or the diaphragm has a thin-walled skirt, to relieve stress on the diaphragm-to-fitting joint.

23 Claims, 2 Drawing Sheets

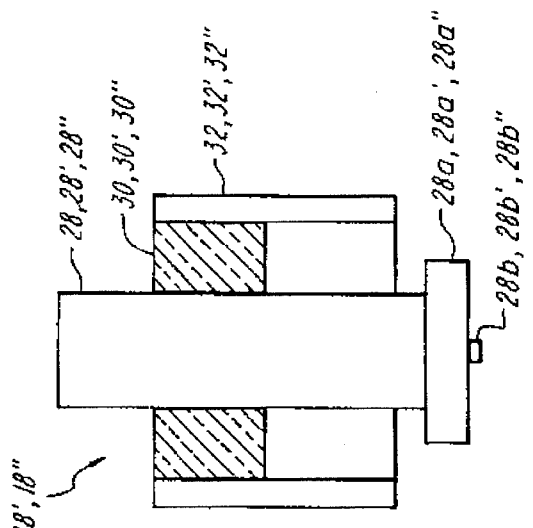
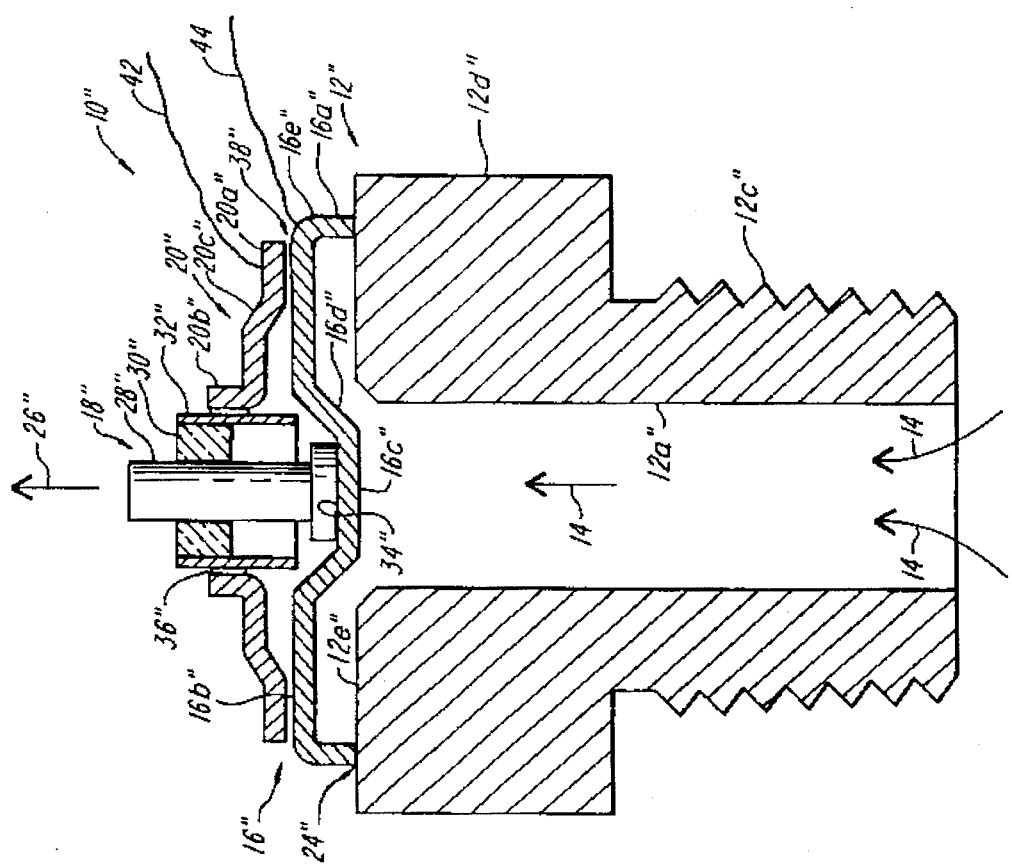

LOW COST, CENTER-MOUNTED CAPACITIVE PRESSURE SENSOR

BACKGROUND OF THE INVENTION

This invention relates in general to pressure transducers. More specifically, it relates to a variable capacitance type sensor with a movable electrode center-mounted on an edge-mounted diaphragm.

A wide variety of transducers are known which convert fluid pressure or force into movement of a diaphragm, which in turn is converted into an electrical signal that corresponds to and measures the pressure or force. One type of transducer which has been proven useful for high accuracy and ruggedness for a wide range of applied pressures measures the diaphragm motion capacitively. The diaphragm forms one plate of a variable gap capacitor. One or more electrodes form the other plate or plates.

U.S. Pat. No. 3,859,575 (Reexamination Certificate B1 No. 3,859,575, May 3, 1988) issued to the present applicant and a co-inventor describes a successful sensor for a capacitive transducer, one where an electrode plate is mounted at its center to the center of the diaphragm. This arrangement enhances the change in capacitance for a given movement of the diaphragm, which increases the accuracy of the transducer. This arrangement also improves the thermal response and avoids capacitance shifts due to thermal stress. It has short thermal paths that provide a fast response to changes in temperature. These advantages were achieved while at the same time meeting other important design objectives such as resistance to mechanical shock and vibration and low hysteresis.

While the '575 sensor has proven successful, it has not been effective in meeting the need for an accurate, rugged and reliable sensor that also has a sufficiently low cost of manufacture that can be used in high volume applications such as in automobiles, off-road vehicles, compressors and many other industrial applications. A principal drawback is the cost of machining the diaphragm and other components such as electrode installation material. In the FIGS. 1, 3 and 4 embodiments shown in the '575 patent, the fitting and diaphragm are bored and threaded, a boss is machined on the diaphragm for at least high pressure applications, and an anti-hysteresis groove is machined in the diaphragm. The boring and threading of the diaphragm is particularly important since it holds a threaded stud that locates a position shim, the electrode, and a nut to secure this assembly. This level of precision, numerically controlled machining is much too costly for high volume, low-cost applications. Besides these machining costs, these embodiments require that the electrode be constructed as an assembly having an internal dielectric ring to provide electrical insulation between the diaphragm and the electrode. In addition, the shim is a permanent spacing element. It is tightened against the diaphragm and the electrode assembly. This produces a high level of friction as the diaphragm deforms, which in turn produces hysteresis. The anti-hysteresis groove controls the hysteresis, but the groove necessitates a diaphragm of a certain thickness and requires a further machining operation to produce the groove. For low pressure applications, machining a very thin diaphragm to a given thickness and to be sufficiently flat proved to be costly.

FIG. 2 of the '575 patent shows an early attempt at a low cost version of the center mount design. A stamped metal plate diaphragm has a central flat portion with its edges clamped to the end of a fitting and sealed with an o-ring. A mounting post is spot welded to the center of the flat diaphragm portion. The electrode is an integral, metal-only piece with a flat, annular outer portion and a central cylindrical section surrounding the post. An epoxy resin bridges the central post and the cylindrical section. It provides mechanical support for the electrode as well as electrical isolation.

While this arrangement avoids the machining costs of the FIGS. 1, 3 and 4 embodiments, it has other significant drawbacks which have prevented its use commercially. For high pressure applications, e.g. to 5,000 to 10,000 lbs/in$^2$, a thick diaphragm is necessary to withstand the substantial accumulated fluid force. During deflection stress in the diaphragm concentrates at its center and its periphery. After repeated cycles of operation, the high stresses at these points can deteriorate the repeatability of the movement, or cause the construction to fail, as by breakage of the post-to-diaphragm weld or fatiguing of the clamped metal edge at the periphery. For low pressure applications, the diaphragm must be thin in order to follow the pressure changes. With the FIG. 2 diaphragm, this thin diaphragm offers little resistance to a sideways rotation of the post and the electrode mass assembled to it. This mechanical spring-mass system has a low natural frequency; it is highly susceptible to shock and vibration.

Another serious deficiency is that the adhesive used to assemble the electrode to the post is also the source of electrical insulation between the plates of the variable capacitor. The FIG. 2 construction uses temporary shims. The cement is applied and the shims removed when it sets. Suitable dielectric adhesives are organic materials such as the epoxy resin specified in the '575 patent. But epoxy resin and other organic cements are not high quality insulators. Their dielectric constants are not stable over time or stable with changes in atmospherics such as ambient temperature and humidity. This is a serious problem since the capacitance of the epoxy-filled gap between the post and electrode is in parallel with the variable capacitance gap making the measurement. Changes in the epoxy dielectric therefore produce errors in the measured pressure. While a material such as glass is much more stable, it melts at such a high temperature that it is impractical to use as a cement during assembly.

It is therefore a principal object of the invention to provide a variable, center-mounted capacitive sensor having an extremely low cost of manufacture, while retaining the good performance characteristics of the center-mounted design characteristic of more expensive, highly machined parts.

Another principal advantage is to provide a sensor and method of sensing that is rugged with respect to resistance to shock, vibration, atmospherics such as humidity and temperature changes, both ambient and sudden, and drift over time.

Another advantage is to provide the foregoing advantages without the use of a permanent shim.

Still another advantage is to provide a sensor and method of use which is highly resistant to material fatigue.

Still another object is to provide the foregoing advantages over a full range of pressures, from very low to very high.

Yet another advantage is to provide all of the foregoing advantages while requiring a low skill level for manufacture and assembly.

SUMMARY OF THE INVENTION

A low cost sensor for a capacitive type pressure transducer uses a diaphragm secured to a fitting that directs a fluid to one side of the diaphragm where the fluid pressure causes the diaphragm to deform. The diaphragm is constructed to isolate central stress from a joint between the diaphragm and a mounting assembly at the center of the diaphragm. In a high pressure embodiment, the diaphragm has an increased central thickness. In a preferred, low and medium pressure embodiment, a thin, sheet-like diaphragm has a central, cup-shaped dimple. In both embodiments the diaphragm is continuously edge-mounted to the fitting at a region of reduced wall thickness in the fitting or in a skirt formed integrally with the diaphragm. The thinning is such that the motion at the center of the diaphragm is enhanced while the stress at a joint between the diaphragm and the fitting is reduced.

The mounting assembly includes a central metallic post with a head that abuts, and is welded or otherwise assembled to, the center of the diaphragm. In a preferred form, a nib of metal on the end face of the post vaporizes due to the electric current and produces an arc to weld the post to the diaphragm. An outer metal collar surrounds the post concentrically and is spaced axially from the diaphragm. A high quality inorganic dielectric such as glass adheres to and bridges the post and collar. The post and collar are formed of suitable materials such as an iron alloy whose coefficient of thermal expansion is well suited to that of the glass. The use of such a mounting assembly allows the use of molten glass as the electrical insulation. This is a significant improvement over the '575 prior art where molten glass is not a practical material. The thermal coefficients need not be identical. A disparity in coefficients can precompress the glass to produce a compression joint.

An electrode is secured to the collar by a thin layer of flowable adhesive such as an epoxy resin or a soft solder. The latter is preferred for high accuracy applications. An initial diaphragm-to-electrode spacing is set by removable shims while the adhesive or solder is applied and sets. The shims are then removed. The absence of a permanent shim and any mechanical clamping reduces friction and hysteresis during operation. The electrode is preferably stamped from sheet metal as a single, integral component. Electrical isolation from the diaphragm is provided reliably by the glass in the metal-glass-metal assembly. The dielectric coefficient of the glass is highly stable during changes in temperature and humidity.

The axial position of the glass spacer and the lengths of the axial component of the thermal paths on opposite sides of the glass spacer are selected so that for a given range of operating temperature axial length changes along these two thermal paths produce a net zero change in the gap between the electrode and the diaphragm.

Viewed as a process for measuring fluid pressure by transforming the pressure into a capacitance value, the invention includes the steps of (i) converting the fluid pressure into a mechanical movement along a first direction by applying the fluid to one side of an edge-mounted diaphragm, (ii) supporting an electrode at the center of the diaphragm in a generally uniformly spaced relationship that is at a constant value for a given applied fluid pressure, (iii) isolating stress produced by said movement from said center mounting joint by introducing the rigidity of the diaphragm at its center, (iv) electrically isolating the diaphragm from the electrode with a highly stable dielectric, and (v) cementing the electrode to said mounting assembly. Further steps include securing the mounting assembly to the diaphragm with a metal-to-metal weld of an abutting post and the diaphragm, relieving edge stress in the diaphragm during movement by introducing flexibility in a supporting structure adjacent a diaphragm-to-support joint, and providing automatic temperature compensation within a preselected range of temperatures by adjusting the position of the inorganic dielectric in the first direction, and thereby balancing oppositely directed thermal motion paths.

These and other features and objects will be more fully understood from the following detailed description which should be read in light of the accompanying drawings.

BRIEF DESCRIPTION OF THE DRAWINGS

FIG. 3 is a view corresponding to FIG. 2 of an alternative low and medium pressure embodiment; and FIG. 4 is a detailed view in vertical section of the metal-to-glass assembly shown in FIGS. 1–3.

DETAILED DESCRIPTION OF THE PREFERRED EMBODIMENT

Figure 1:
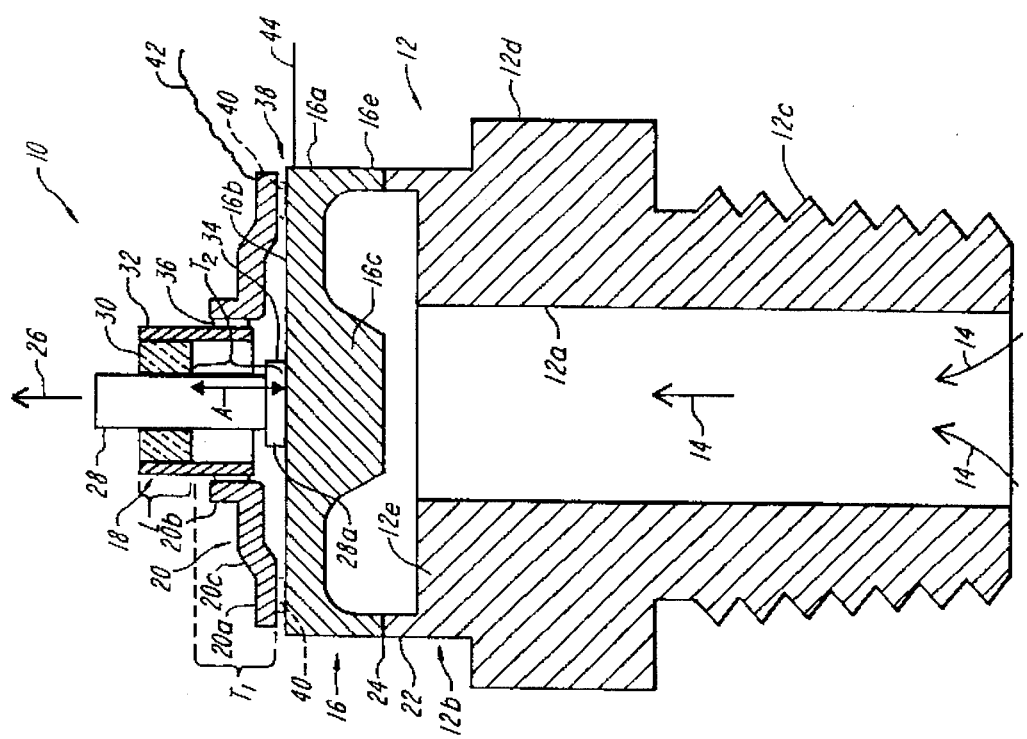
FIG. 1 is a view in vertical section of a low cost pressure sensor constructed according to the present invention which is adapted for high pressure applications.

FIG. 1 shows a low cost sensor 10 adapted for the measurement of the pressure of a fluid containing member such as a vessel, conduit, or the like. A fitting 12 threads onto or is otherwise secured to the vessel by threads 12c. The fitting has a central, hollow passage 12a that directs the fluid 14 to an end 12b of the fitting removed from the vessel. Flange 12d is formed integrally with the fitting and has a polygonal outer surface to accommodate a wrench. The fitting body 12e is preferably circular with a center hole. As used in this application, low pressure is less than about 100 psi (lbs/in$^2$), medium pressure is roughly in the range of 100 to 1,000 psi, and high pressure is in excess of 1,000 psi, with a typical high pressure operating range being 1,000 to 10,000 psi.

Principal features of this invention include a diaphragm 16, a metal-glass-metal mounting assembly 18 that supports and electrically isolates an electrode 20, and a reduced thickness portion 22 of the wall 12e at the "upper" end 12b of the fitting. As used in this application, "upper" and "lower" are not limiting, but merely refer to the orientations shown in the figures. "Upper" as shown is distal from the fluid vessel; lower is proximate to it. "Axial" is the direction from lower to upper.

The diaphragm is continuously welded or otherwise permanently secured along its periphery 16a to the wall portion 22 in a joint 24. The diaphragm material, dimensions and configuration are selected to produce a reliably detectable degree of bowing (an outward, drum head-like bulging deformation) of the diaphragm in response to the applied fluid pressure in the direction of the arrow 26 along the central axis of the fitting and normal to the upper surface 16b of the diaphragm. Because the diaphragm is edge-mounted, its movement in response to an applied fluid pressure is very small at the periphery 16a, and at a maximum at its center 16c. This differential deformation produces maximum stress within the diaphragm at its center 16c and its periphery 16a.

The mounting assembly 18 includes a central metallic post 28, a dielectric ring 30, and an outer metallic collar 32. The dielectric is an inorganic material that bonds to the metal, either by adhesion or by high radial compression which is produced by heat shrinking of the collar 32 as when the molten dielectric cools. It has a dielectric coefficient that is highly stable over time and despite changes in atmospherics such as ambient temperature or humidity. The preferred material is glass or ceramic. The metal of the post and collar is an iron alloy whose coefficient of thermal expansion is close to that of the glass for a zero strain seal or suitably different from that of glass to produce a compression seal. It is very significant that the glass spacer ring 30 completely insulates the inner 28 and outer 32 metallic members electrically. The capacitance between these two metallic members is in parallel with the measuring capacitance gap between the electrode 20 and the diaphragm surface 16b, and therefore any variations in the dielectric characteristics of the spacer ring produce measurement errors.

The central post has a planar, cold-formed head 28a that abuts the diaphragm surface 16b at the center of the diaphragm. A joint 34 such as a fusion or stud weld permanently secures the head to the diaphragm. The head can include a small nib 28b at its center (FIG. 4) which vaporizes when a welding current is applied between the head 28a and the diaphragm to produce an arc that makes the weld. The increased area of the head as compared to the cross-sectional area of the post 28 provides a broader, and more stable connection.

Figure 2:
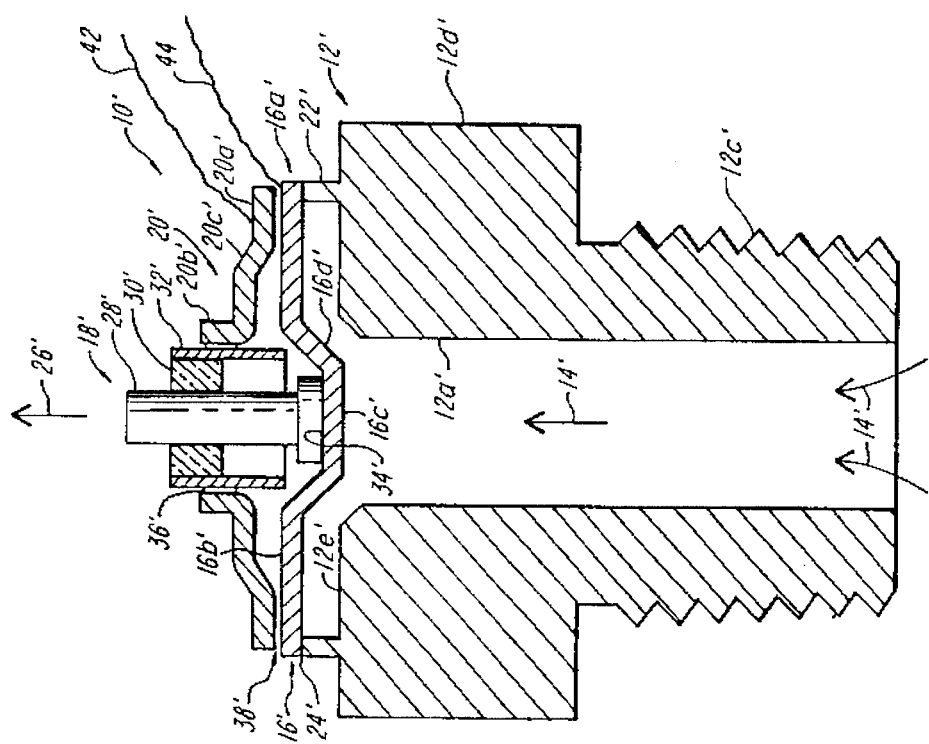
FIG. 2 is a view corresponding to FIG. 1 of a low cost pressure sensor according to the present invention particularly well suited for use in low and medium pressure applications.

Controlling the stresses in the diaphragm to avoid hysteresis, fatigue, and unit failure is very important. To this end, for at least high pressure applications the present invention uses a thickened central region 16d to stiffen the diaphragm over the region of the joint 34. This isolates the joint to a substantial degree from the large stress accumulations produced at the center of the diaphragm by its deflection in response to an applied pressure. Depending on the thicknesses and materials of the diaphragm and the anticipated fluid pressures that will be encountered in use, the region 16d can be machined with straightforward turning or it can be stamped into this configuration from sheet material as shown in FIGS. 2 and 3. Stamping has obvious cost advantages; machining may be necessary to resist very high fluid pressures applied over sufficiently large diaphragms. To relieve peripheral stresses on the joint 24, another principal feature is the thinned wall portion 22 of the fitting. As shown, there is a substantial recess from the central passage 12a to the end wall 22. This can be formed through a simple turning operation. The height and thickness of the wall 22, in combination with the material used to form the fitting and the nature of the joint 24, are selected to relieve much of the peripheral stress in the diaphragm in a deflection of the wall portion 22, as opposed to having it concentrate in the joint and the diaphragm end wall 16e. For fittings formed of 17-4 PH stainless steel and used with diaphragms having a diameter of ½ to ¾ inch, the wall portion 22 has a height of 0.1 inch and a thickness of 0.02 inch.

A thin layer of a flowable cement secures the electrode 22 to the collar 32 in a joint 36. The joint 36 need not be electrically insulating because the glass ring 30 serves the purpose of providing the desired insulation. Nor does it need to exhibit highly stable electrical characteristics. Conventional soft solder or an organic cement such as an epoxy resin are suitable. When an organic cement is used, it is desirable to short out the collar 32 to the electrode 20 electrically. This avoids creating a series capacitance which may not be very stable. In assembly, the air gap 38 is set between a flat, annular outer portion 20a of the electrode and the opposite diaphragm surface 16b by a set of temporary shims 40 (shown in phantom), or an equivalent arrangement such as an assembly fixture or jig. The present invention thus avoids the significant difficulties of creating an electrode-to-mount bond with molten glass or the like. The ability to use conventional solder and adhesives significantly contributes to the ease and low cost of manufacture.

The electrode includes a flange 20b that defines a cylindrical collar that surrounds the collar 32 in a concentric, spaced relationship. A frusto-conical shoulder portion 20c bridges the portions 20a and 20b. The electrode can be stamped at low cost from sheet metal. Note that the closest spacing, and hence the smallest spacing in the gap 38, occurs under the electrode portion 20a. As described in U.S. Pat. No. 3,589,575, the disclosure of which is incorporated by reference, with a center mount at the point on the diaphragm of maximum deflection in the axial direction 26, the change in the capacitance gap 38 corresponding to a given movement of the diaphragm is enhanced by the geometry of the center mount arrangement which provides an increased surface area of the electrode at its periphery.

It is also a significant feature of this invention that the axial position of the glass ring 30 is adjusted to produce an automatic self-compensation for measurement errors produced by thermal expansions and contractions of the sensor elements that define the capacitive air gap 38. More specifically, as shown in FIG. 1, the central post 28 has a length A measured normal to the flat, undeflected diaphragm surface 12b along a first thermal path $T_1$ to the "lower" end of the ring 30. In response to an increase in the temperature, this path tends to lengthen and thereby open the gap 38. On the opposite side of the spacer, a second thermal path $T_2$, including the "lower" end of the collar 32 and the free position of the electrode 20 to the surface 20d directly facing the surface 16b, also tends to lengthen in response to a temperature increase. However, due to the mounting arrangement it lengthens to close the gap 38. The thermal responses of these two paths therefore offset one another. Depending on parameters such as the axial dimensions and material of the electrode, the length L of the ring 30, or more precisely, the position of its lower end 30a which defines where the metallic portions of the mounting assembly become free to move, the sensor can be tuned to be generally insensitive to temperature variations within a given range of operating temperatures. (There is some change in length at the glass-metal interface of the assembly 18 that is very complex, especially when the coefficients of thermal expansion of the materials is very different. But this shift is repeatable and can be compensated empirically in the selection of the relative lengths of $T_2$ versus $T_1$.)

FIGS. 2 and 3 illustrate two forms of a preferred embodiment of this invention that is particularly well suited for use with low and medium pressure applications, but can be used for high pressure applications as well. Like parts have the same number as in the FIG. 1 embodiment, but with a prime in FIG. 2 and a double prime in FIG. 3.

A principal difference is that the diaphragms 16', 16" are stamped from a sheet metal such as a high quality spring steel. They include a central "dimple" or cup-shaped depression 16d',16d". The dimple isolates the weld joint 34',34" from the concentrated central stresses in the diaphragm, as in the FIG. 1 embodiment. It also increases the rigidity of the thin sheet diaphragm which is very important in stabilizing the mass of the mounting assembly 18',18" and electrode 20',20" against a side-to-side rotation or swaying. Without the dimple, the spring mass system of the diaphragm, mounting assembly and electrode has a low natural frequency and is highly susceptible to shock and vibration. The dimple 16d',16d" rigidifies the system to a degree that the natural frequency becomes high and the system exhibits a good resistance to mechanical shock and vibration on a par with what is needed for typical industrial applications.

Another difference is that the diaphragm 16' has no skirt 16e. The diaphragm is sized so that one outer edge rests on a thin walled fitting end 22' where it is permanently and continuously joined in a weld joint 24'. The diaphragm 16" does have a skirt 16e"; it is formed integrally. Its lower edge is also continuously joined to the fitting 12" in a weld joint 24". This embodiment avoids the cost of machining an end 22' on the fitting.

The mounting assembly 18' is similar in construction to FIG. 1. The joint 34',34" is again preferably a weld of face-abutting members, the end face of the post 28',28" abuts the central position of the diaphragm surface 16b',16b" lying within the dimple 16d',16d".

The joint 36',36" is again a flowable adhesive such as soft solder or epoxy resin adhesive. The electrode portion 20a', 20a" is in a parallel spaced relationship with the opposite diaphragm surface 16b',16b" to define therebetween an air gap 38',38" of a variable capacitor. Temperature compensation is set by positioning the glass spacer ring and otherwise selecting the thermal path lengths of components on opposite sides of the spacer ring, connected to and including the post 28 and collar 30, so that thermal expansions and contractions of these paths generally cancel out one another.

In operation the fitting 12,12',12" is threaded or otherwise secured to a vessel containing the fluid whose pressure is to be measured. The fluid flows into the passage 12a,12a',12a" and acts on the diaphragm 16,16',16" causing it to deform outwardly. The degree of movement of the diaphragm in the axial direction normal to the diaphragm corresponds to the applied pressure. The center mount assembly carries this diaphragm movement into a corresponding axial movement of the electrode, which opens the gap 38,38',38" between the electrode 20,20',22" and the diaphragm 16,16',16". This gap change is most pronounced at the outer portions of the gap. Lines 42 and 44 connect the electrode and diaphragm to suitable known circuitry that amplifies, conditions and linearizes an output signal corresponding to the value of the capacitor formed by the electrode and the diaphragm. Changes in humidity affect the measurement only as it changes the dielectric constant of the air in the gap 38,38', 38" which usually is very small. The leakage capacitance across the ring 30,30',30" is substantially impervious to the changed atmospherics. Changes in temperature, as noted above, are to a large extent automatically compensated for by the sensor construction features described above.

Viewed as a method of measuring a fluid pressure by transforming the pressure into a capacitance value, the invention includes the steps of converting the fluid pressure into a mechanical movement along a first direction by applying the fluid to one side of an edge-mounted diaphragm, supporting an electrode at the center of the diaphragm in a generally uniformly spaced relationship, isolating stress produced by said movement from said center mounting by introducing the rigidity of the diaphragm at its center, electrically isolating the diaphragm from the electrode with a highly stable dielectric, maintaining a generally constant spacaing of the air gap for a given applied pressure at the diaphragm, and cementing the electrode to said mounting assembly (while setting the diaphragm to electrode spacing with a removable shim). Further steps include securing the mounting assembly to the diaphragm with a metal-to-metal weld of an abutting post and the diaphragm, relieving edge stress in the diaphragm during movement by introducing flexibility in a supporting structure adjacent a diaphragm-to-support joint, and providing automatic temperature compensation within a preselected range of temperatures by adjusting the position of the inorganic dielectric in the first direction, and the axial length of the thermal paths on opposite sides of the dielectric to balancing oppositely directed thermal motions.

By way of illustration, but not of limitation, in the FIG. 1 embodiment, for operation at pressures of 5,000 to 10,000 lbs/in$^2$, the diaphragm has a diameter of 0.5 to 0.75 inch, a thickness of 0.06 inch (measured away from the central thickened area), and is formed of a high strength steel. The thickness at the center is about 0.2 inch. This diaphragm, operating at these pressures, typically produces an axial measuring motion at the center of the diaphragm of about 0.002 inch. In the FIG. 2 embodiment, for operation at low pressure, e.g. 30 lbs/in$^2$, the same diameter diaphragm is stamped from high quality spring steel with a thickness of about 0.005 inch. The central dimple is depressed about 0.1 inch and has a maximum diameter of about 0.2 inch. A typical axial measuring motion at the center of the diaphragm is 0.002 inch.

There has been described a sensor and method of measuring fluid pressure accurately and reliably that are characterized by a low cost of manufacture. Despite the low cost/high volume manufacturing advantages, the sensor is relatively insensitive to temperature variations, material fatigue, mechanical shock, vibration and atmospherics. It is also characterized by low hysteresis. All of these advantages are available over a full range of pressures, from very low to very high. Sensor assembly is uncomplicated with only low skill levels required, which contributes to the low cost.

While the invention has been described with respect to its preferred embodiments, it will be understood that various modifications and alterations will occur to those skilled in the art from the foregoing detailed description and the accompanying drawings. For example, while the invention has been described with a thickened or cup-shaped depression of the central diaphragm portion to isolate stresses and resist rotation of the electrode and its mount, other geometries of thickening and other patterns of sheet deformation can be used. Further, while preferred forms of a metal-glass-metal preform assembly have been described and illustrated, other arrangements of these materials, or other materials that perform the described functions, can be used. However, such configurations may not be as available or have comparable cost advantages. These and other modifications and variations are intended to fall within the scope of the appended claims.

What is claimed is:

1. A sensor for a variable capacitance type transducer that transforms the pressure of a fluid into a corresponding capacitance value, comprising:

a pressure fitting with a passage extending axially to direct the fluid from a first end to a second end, a diaphragm secured at its peripheral edges to said fitting at said second end in a first joint, an assembly comprising a first metallic post secured at one of its ends to the center of said diaphragm, a metallic collar in a spaced relationship with and at least in part lying radially outside of said post, and an inorganic dielectric spacing ring secured between said post and said collar, means for securing said post to the center of said diaphragm at a second butt joint, an electrode, and an adherent filler that secures said electrode to said collar without said filler contacting said diaphragm to establish a generally parallel spaced relationship between said electrode and said diaphragm to form a variable capacitor whereby changes in the electrode-to-diaphragm gap produced by a flexure of said diaphragm in response to the fluid pressure spacing provide a capacitive measure of the fluid pressure.

2. The sensor of claim 1 wherein said diaphragm is of sufficient thickness to resist high pressures and wherein said diaphragm has a region of increased thickness at its center to resist the transmission to said second joint of stress in said diaphragm produced by said flexure.

3. The sensor of claim 2 wherein said fitting at said second end has a generally cylindrical wall portion of reduced thickness whereby flexure stress deforms said reduced thickness wall portion to reduce the stress at said first joint.

4. The sensor of claim 1 wherein said diaphragm is sufficiently thin to move in response to low and medium values of the fluid pressure and said diaphragm includes a central mechanical deformation.

5. The sensor of claim 4 wherein said diaphragm is formed from a sheet metal and said mechanical deformation is a central cup-like depression.

6. The sensor of claim 1 wherein said sheet metal is a high quality spring steel.

7. The sensor of claim 1 wherein said inorganic dielectric spacing ring is formed of a glass and said post and collar have coefficients of thermal expansion compatible with that of said glass.

8. The sensor of claim 1 wherein the coefficients of thermal expansion of said ring and said post and collar are selected so that said ring is prestressed in compression to form a rigid joint between said post and collar and said ring.

9. The sensor of claim 1 wherein said inorganic dielectric spacing ring is positioned and dimensioned in said axial direction such that the axial length of a first thermal path in said first metallic member from said ring to and including said diaphragm is generally equal to the axial length of a second thermal path in said second metallic member from said spacer to and including the electrode, whereby changes in temperature produce self-compensating changes in the axial lengths of said first and second thermal paths to maintain said capacitive gap at a generally constant value.

10. The sensor of claim 1 wherein said post securing means includes a head that abuts said diaphragm and a metallic nib protruding from said head toward said diaphragm that is fusible to produce said securing with a weld.

11. The sensor of claim 1 wherein said filler comprises an annular layer of an adherent material.

12. The sensor of claim 11 wherein said adherent material is an organic cement.

13. The sensor of claim 11 wherein said adherent material is a metallic solder.

14. The sensor of claim 5 wherein said diaphragm includes a skirt formed integrally at its periphery and terminating in said first joint.

15. A sensor for measuring the pressure of a fluid capacitively, comprising, a generally tubular fitting extending along a first axis from a first end in fluid communication with the vessel to a second end, a diaphragm edge-mounted to said second end at a first joint and deformable along a first axis normal to the diaphragm in response to the fluid pressure, an electrode, a mounting assembly for supporting said electrode over said diaphragm in a spaced relationship to define a generally annular capacitive gap between said diaphragm and said electrode while electrically insulating said electrode from said diaphragm, said mounting assembly having a central post secured at one generally flat end to the center of said diaphragm and extending along said first axis, a metallic collar surrounding said post in a spaced relationship and also spaced axially from said diaphragm, and an inorganic dielectric ring secured between said post and said collar, a nib projecting from said generally flat post end that is welded to secure said central post end to said diaphragm center at a generally flat, rigid joint, and an annular filler that rigidly secures said electrode to said collar, said filler being spaced from said diaphragm.

16. The sensor of claim 15 for high pressure applications wherein said diaphragm has a central region of increased thickness to resist transmission of stress produced by said deformation to said post securing means.

17. The sensor of claim 16 wherein said fitting has a reduced wall thickness at said second end adjacent said first joint to flex in response to said deformation at said reduced wall thickness in preference to said first joint.

18. The sensor of claim 15 for low and medium pressures wherein said diaphragm is formed of a sheet metal and includes a central dimple.

19. The sensor of claim 15 wherein said spacer ring is glass, said central post securing means is a weld, and said electrode securing means is an adherent flowable at temperatures below the fusion temperature of said glass.

20. A process for measuring fluid pressure with a variable capacitor formed by a diaphragm edge-mounted on a fitting at a first joint and an electrode spaced closely from the diaphragm, comprising directing the fluid to act on one side of the diaphragm and deform it in response to the pressure, supporting the electrode from the center of the diaphragm with a gap of predetermined spacing therebetween so that movement of the diaphragm produces a corresponding movement of the electrode said supporting including providing a mutually concentric metallic post and collar, isolating the diaphragm and the electrode electrically with an inorganic dielectric material bridging said post and collar, securing said post to the diaphragm at a second butt joint, cementing said electrode to said second metal member with a an annular filler of a flowable adhesive that is spaced from said diaphragm, flowable adhesive, and rigidifying said diaphragm to isolate stress in said diaphragm from said second joint.

21. The process of claim 20 further comprising the step of introducing a resilience to said fitting adjacent said edge-mounting.

22. The process of claim 20 wherein said electrode supporting and electrode isolating also automatically self-compensate to maintain a preset value for said close electrode-to-diaphragm spacing despite variations in temperature.

23. A process for capacitively measuring the pressure of a fluid via a fitting with a variable capacitor formed by a diaphragm and an electrode, comprising the steps of converting a fluid pressure change into a corresponding mechanical movement along a first axis by applying the fluid to one side of the diaphragm edge-mounted on the fitting and thereby flexing the diaphragm, supporting the electrode on a generally flat surface of the diaphragm at the center of the diaphragm opposite the fitting with a pre-assembled metal-post inorganic dielectric material-metal collar mounting assembly, isolating stress in said diaphragm produced by said flexing from said center mounting by enhancing the rigidity of said diaphragm at its center, electrically isolating the diaphragm from the electrode with the inorganic dielectric material in said mounting assembly, and cementing the electrode to the collar of said mounting assembly with an annular ring of a filler cement that is spaced from the diaphragm.

* * * * *

UNITED STATES PATENT AND TRADEMARK OFFICE
CERTIFICATE OF CORRECTION

PATENT NO. : 5,542,300

DATED : August 6, 1996

INVENTOR(S) : Shih-Ying Lee

It is certified that error appears in the above-identified patent and that said Letters Patent is hereby corrected as shown below:

In the Claims: Col. 9, line 7 of claim 1, please delete "spacing".

Signed and Sealed this

Sixth Day of February, 2001

Attest:

Q. TODD DICKINSON

*Attesting Officer*  *Director of Patents and Trademarks*